June 11, 1968   W. S. POWERS, JR   3,387,704
APERTURE GAUGING AND SORTING DEVICE
Filed Jan. 11, 1966   6 Sheets-Sheet 1

WITNESS:
Esther M. Stockton

INVENTOR.
Whitney S. Powers, Jr.
BY Clinton S. Janes
ATTORNEY

INVENTOR.
Whitney S. Powers, Jr.

June 11, 1968 W. S. POWERS, JR 3,387,704
APERTURE GAUGING AND SORTING DEVICE
Filed Jan. 11, 1966 6 Sheets-Sheet 3
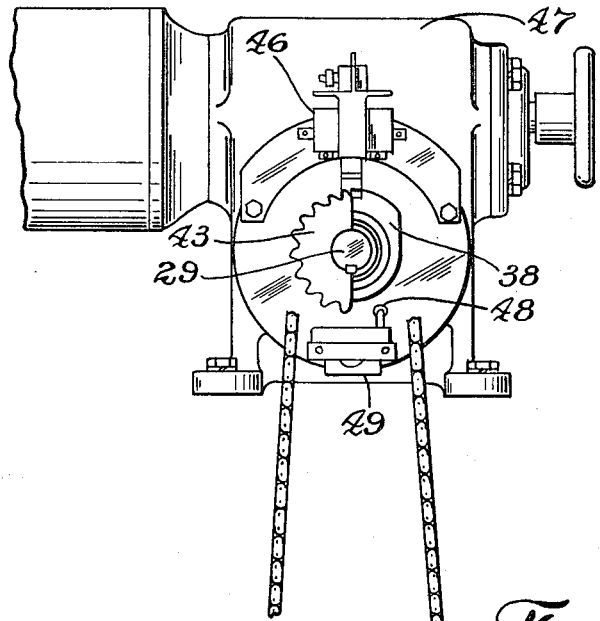
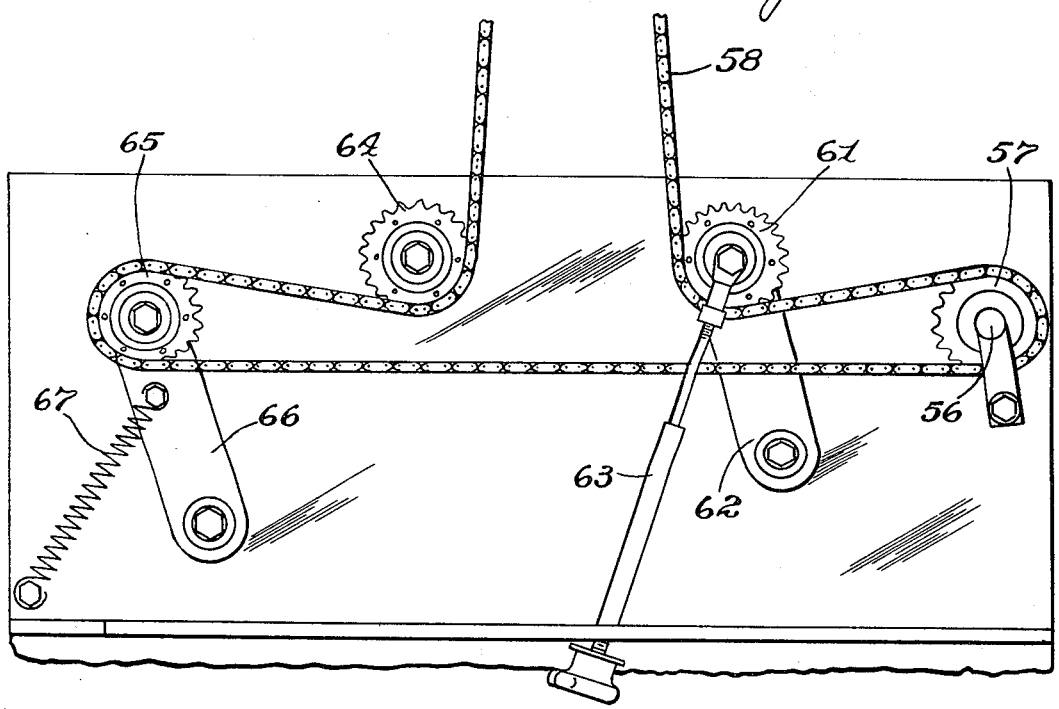
Fig. 3
WITNESS:
Esther M. Stockton
INVENTOR.
Whitney S. Powers, Jr.
BY Clinton A. James
ATTORNEY

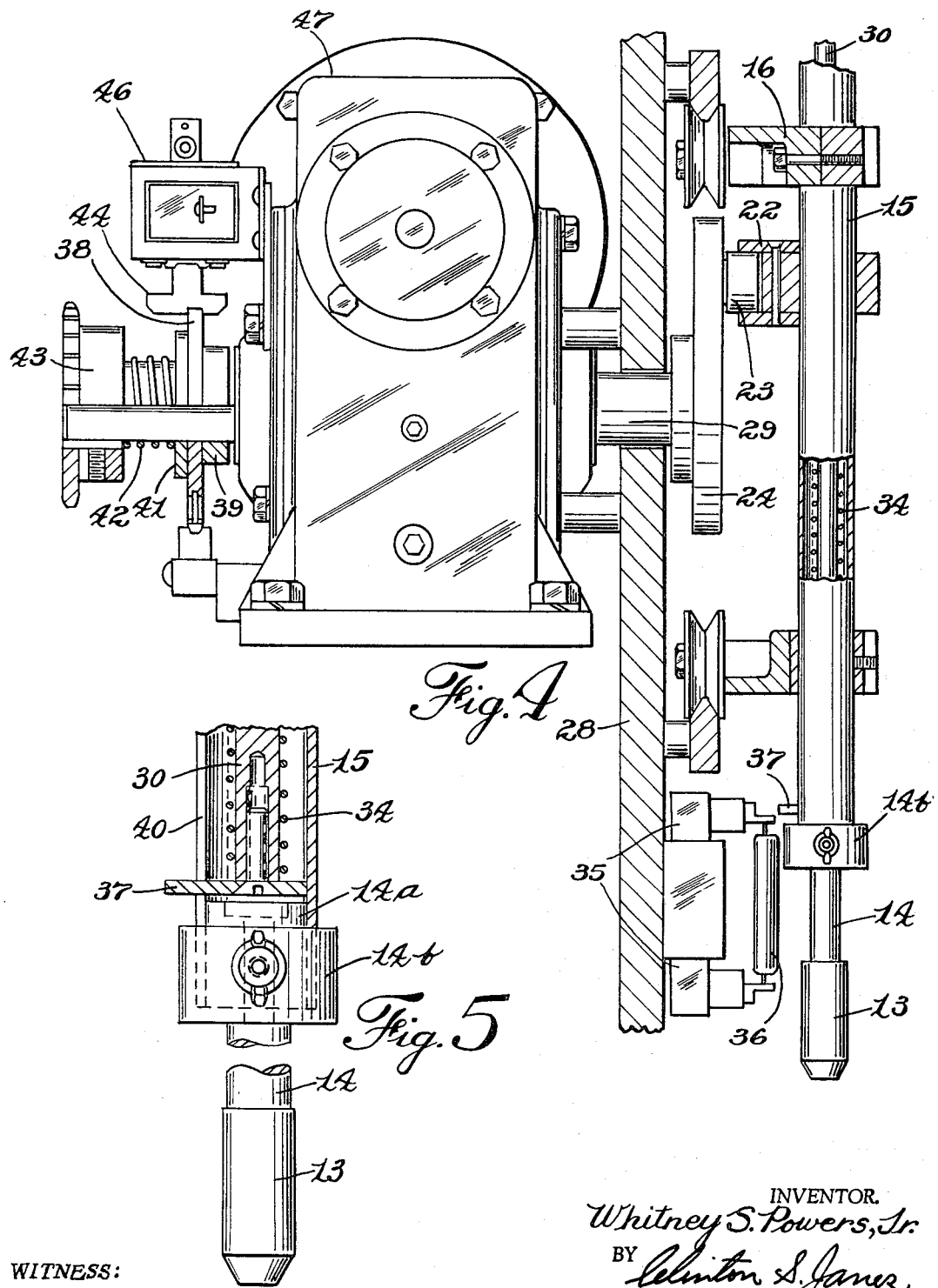

WITNESS:
Esther M. Stockton

INVENTOR.
Whitney S. Powers, Jr.
BY Clinton S. Janes
ATTORNEY

June 11, 1968   W. S. POWERS, JR   3,387,704
APERTURE GAUGING AND SORTING DEVICE
Filed Jan. 11, 1966   6 Sheets-Sheet 6 linear-motion contour
sine return contour

WITNESS:
Esther M. Stockton

INVENTOR.
Whitney S. Powers, Jr.
BY Clinton S. Janes
ATTORNEY

United States Patent Office 3,387,704
Patented June 11, 1968

3,387,704
APERTURE GAUGING AND SORTING DEVICE
Whitney S. Powers, Jr., Pine City, N.Y., assignor to Powers Manufacturing, Incorporated, Elmira, N.Y., a corporation of New York
Filed Jan. 11, 1966, Ser. No. 519,991
6 Claims. (Cl. 209—73)

ABSTRACT OF THE DISCLOSURE

The articles to be gauged are brought to the gauging area by a linear conveyor, and then moved through that area at a constant speed by means of a screw conveyor. The gauge is mounted above the conveyor in a horizontally reciprocable carriage which, during the gauging operation, is traversed by a cam actuator in precisely timed relation to the screw conveyor to maintain vertical alignment of the gauge and container as the gauge is projected into and withdrawn from the container. Resistance to the entry of the gauge of a defective container causes ejection of the container after it leaves the gauging area.

---

The present invention relates to a machine for gauging filler openings of hollow containers and more particularly to a device for gauging the diameter of the necks of glass bottles while in motion on a linear conveyor, and automatically ejecting defective bottles from the line.

It is an object of the present invention to provide a novel gauger and ejector mechanism which is simple in construction, and efficient and reliable in operation.

It is another object to provide such a device in which a single gauge is caused to engage and test the bottles in sequence as they are continuously traversed through the gauging area.

Further objects and advantages will be apparent from the following description taken in connection with the accompanying drawing, in which:

FIGURE 3 is a rear view of the device showing more particularly the means for synchronizing the traversal of the gauge with the travel of the article to be gauged;

FIGURE 4 is an enlarged side elevation, partly in section, showing the common operating means for the gauge and for the controlling mechanism for the rejecting device, the parts being shown in the positions assumed during the return stroke of the gauge carriage;

FIGURE 5 is an enlarged detail of the gauge and its detachable mount;

Figure 1:
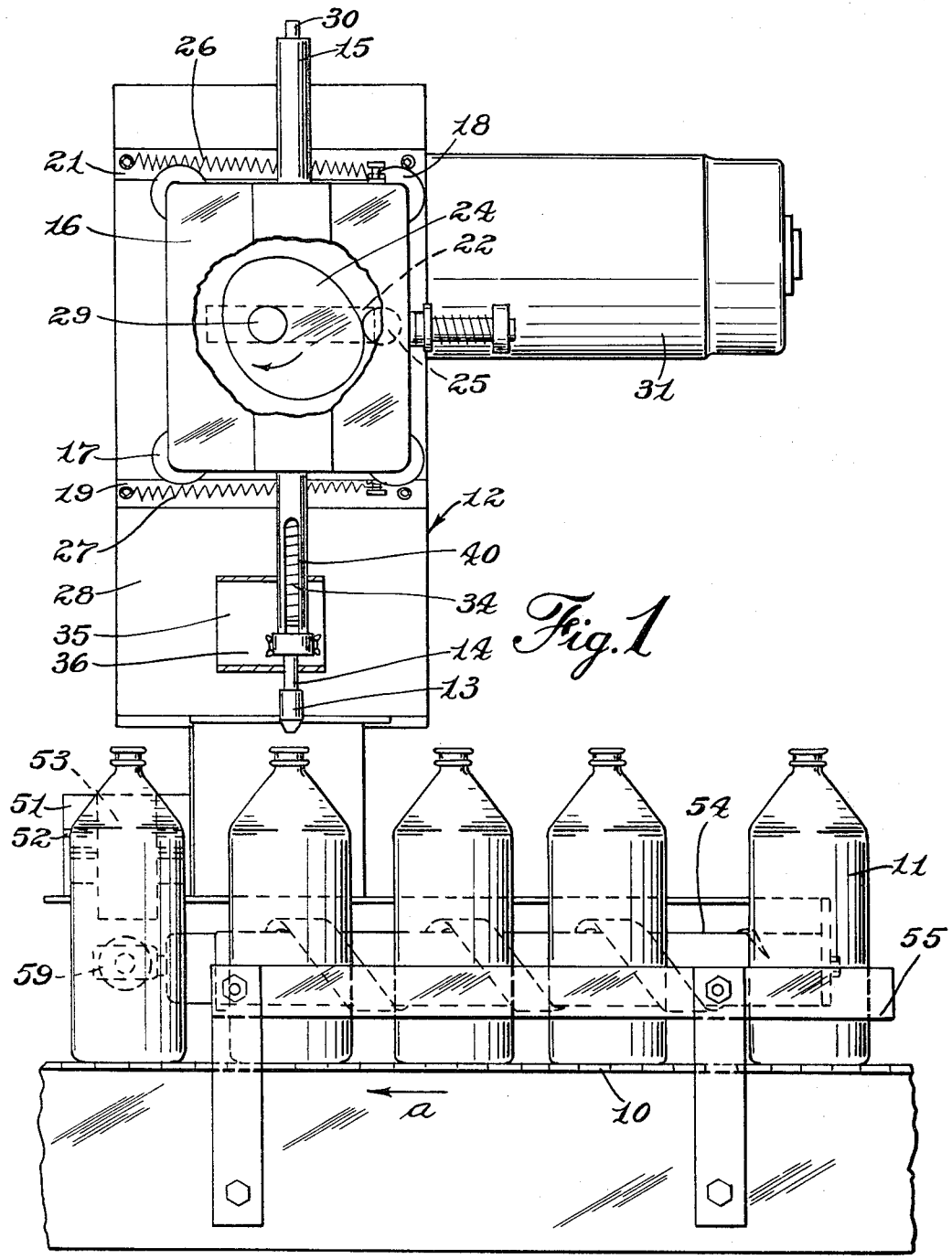
FIGURE 1 is a front elevation of a preferred embodiment of the invention showing the parts in normal or idle position, certain parts being broken away in order to show more clearly the operating mechanism.

In FIGURE 1 of the drawing there is illustrated a traveling link belt conveyor 10 having conventional operating means, not illustrated, for traversing a procession of articles 11 to be gauged past a gauging mechanism indicated generally by the numeral 12, the direction of motion of the conveyor being indicated by the arrow a.

A plug gauge 13 having a stem 14 is removably mounted, with freedom for telescoping movement, in the lower end of a vertically reciprocable tubular plunger 15 which is mounted in a carriage 16. Said carriage is guided for horizontal movement in the direction of the movement of the conveyor 10, by means of rollers 17, 18 engaging in horizontal track members 19 and 21, respectively.

Means for reciprocating the plunger 15 vertically to move the gauge 13 into and out of the necks of the bottles to be gauged is provided comprising a yoke member 22, shown in section in FIGURE 4, which is clamped to the plunger 15 in a horizontal position and which slidably receives an actuating roller 23 mounted eccentrically on the face of a rotatable cam member 24.

The carriage 16 has fixed in the interior thereof a cam follower 25 in the form of a roller bearing on the peripheral surface of the cam. Springs 26 and 27 anchored to the frame 28 of the gauging mechanism at one end, and to the carriage 16 at the other end, urge the carriage in the forward, direction of travel, holding the cam follower 25 in contact with said cam so that the carriage is reciprocated horizontally by rotation of the cam.

Figure 8:
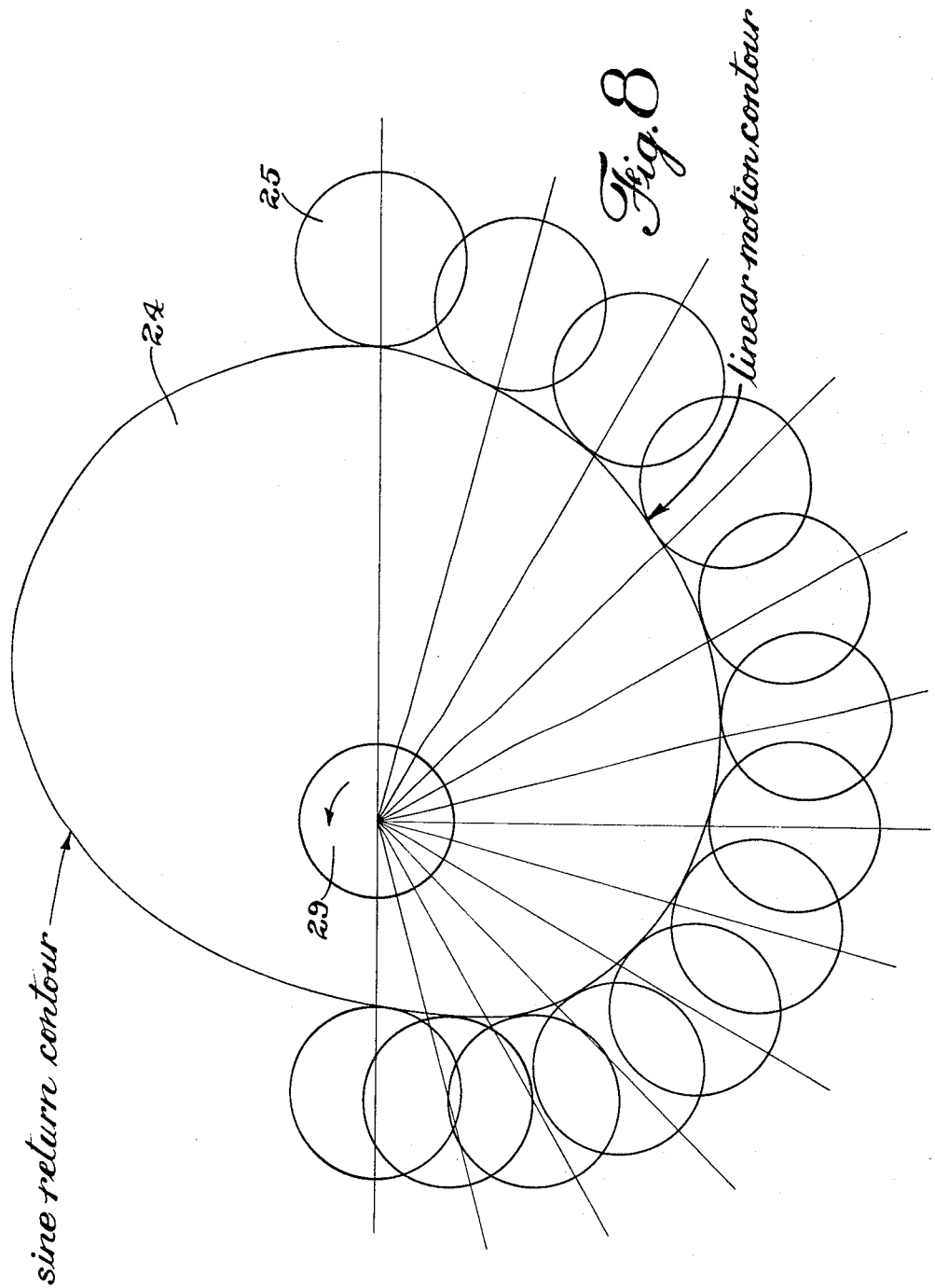
FIGURE 8 is an enlarged rear view of the carriage traversing cam showing the generation of the contour.

The portion of the cam 24 which permits the springs 26, 27 to move the carriage 16 in the forward direction is so formed, as best shown in FIGURE 8, that equal angular movements of the cam cause equal linear traversing movements of the carriage.

Thus, in a cam as illustrated, having a throw of 2⅜ inches, at stations 15 degrees apart, the horizontal distance between the axis of the cam and the axis of the cam follower decreases by a constant decrement of 0.1979 inch. In other words, rotation of the cam clockwise from its normal position through arcs of 15 degrees will cause the carriage to travel 0.1979 inch in the forward direction. This relationship, in conjunction with the means, to be described, for traversing the article to be gauged past the gauging station at a uniform linear speed, causes the gauge and said article to move laterally in unison during the gauging operation.

The portion of the contour of the cam which causes the carriage to be moved back to its starting position may be of any suitable form to minimize shock, such as a sinusoidal curve.

Figure 2:
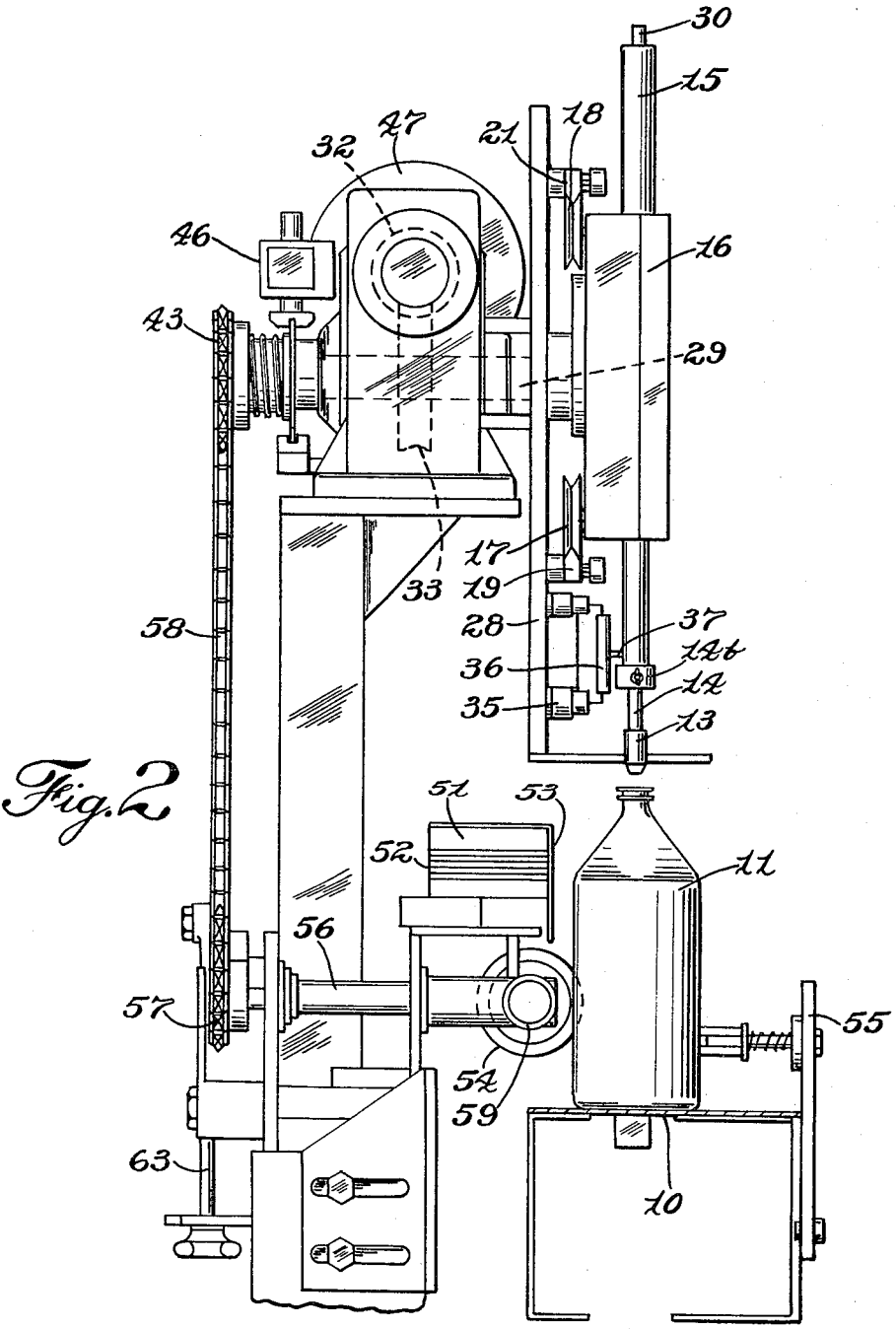
FIGURE 2 is a side elevation of the structure shown in FIGURE 1.

The cam 24 is mounted on a power shaft 29 which is rotated continuously at constant speed during the operation of the device, from a motor 31, by means of reduction gearing 32, 33 as illustrated in FIGURE 2.

The stem 14, of gauge 13, as best shown in FIGURE 5, is provided with an enlarged cylindrical head 14ᵃ which is slidably mounted in the lower end of the plunger 15, being retained therein by a detachable collar 14ᵇ. A compression spring 34 is mounted on a guide rod 30 slidably mounted in the plunger 15 and serves to yieldably maintain the gauge 13 in its normal position. By this arrangement if the neck of the bottle being tested is too small to admit the gauge, the plunger 15 may complete its downward stroke although the downward movement of the gauge is arrested.

Means are provided for setting up a condition responsive to such a contingency whereby the defective article is removed from the line after it has proceeded beyond the gauging position. As here shown, this means comprises a pair of normally open micro-switches 35 mounted on the frame 28 of the gauging mechanism and having a vertically arranged bar 36 mounted on the operating levers of the switches in such a manner that movement of the bar in the direction of travel of the articles to be gauged causes either one or both of the switches to be closed.

A sensing device in the form of a key 37 is fixedly mounted on the lower end of the guide rod 30, in abutting relation to the upper end of the gauge stem 14. Key 37 extends laterally through a vertical slot 40 in the plunger 15 in position to engage the switch bar 36 during the lateral movement of carriage 16 if the normal downward movement of the gauge is prevented by a defective bottle.

Figure 6:
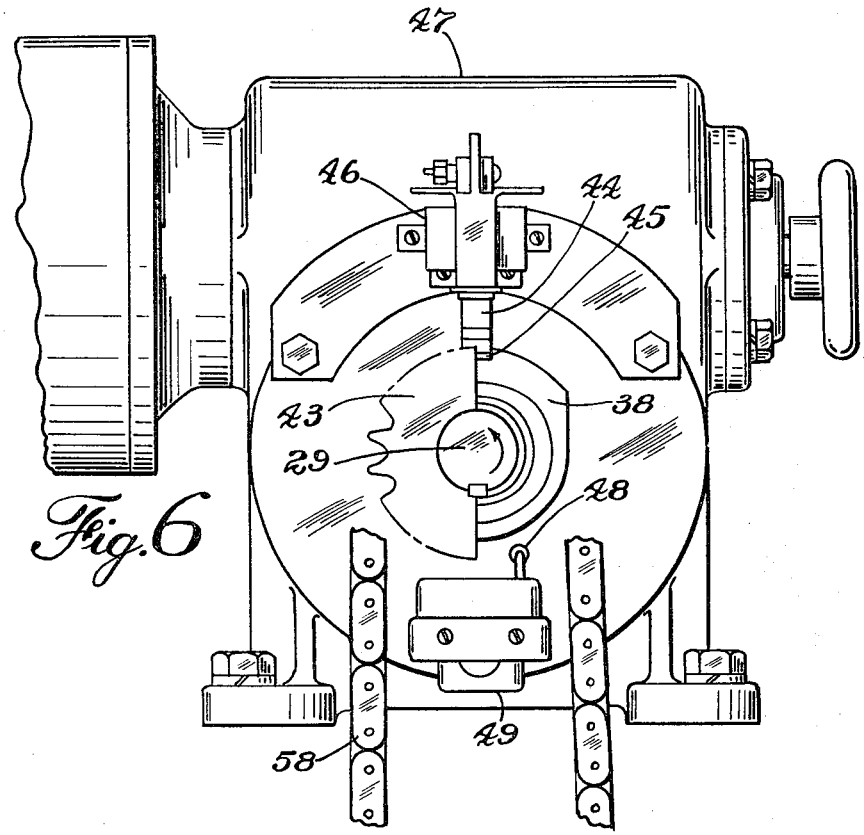
FIGURE 6 is an enlarged view of the cam switch operating means shown in FIGURE 3.
Figure 7:
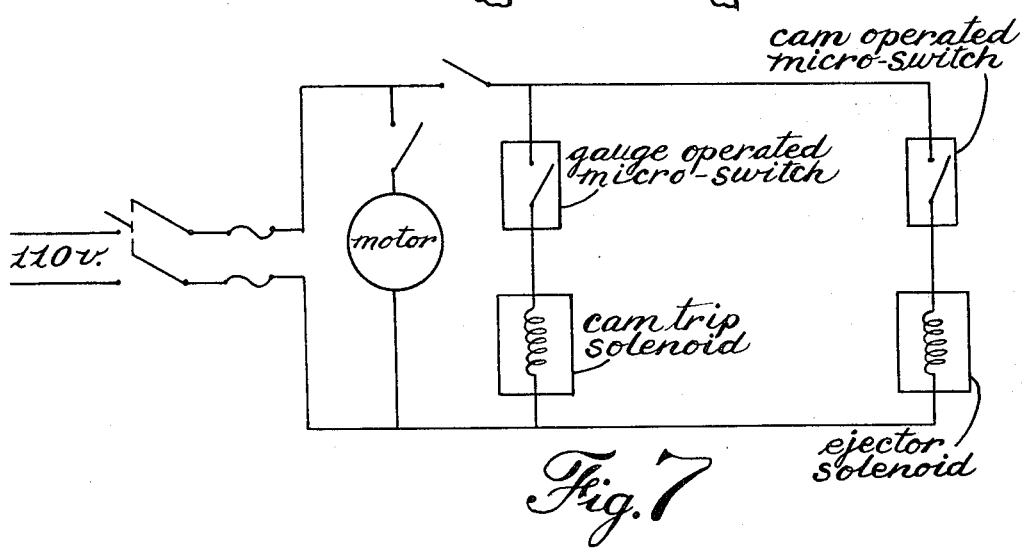
FIGURE 7 is a block wiring diagram of the electrical system.

A delayed action trip device in the form of a cam disc 38 (FIGURE 4) is journaled on the power shaft 29 and frictionally connected to rotate therewith by means of a clutch plate 39 fixed on the power shaft and a second friction clutch plate 41 pressed against the cam disc 38 by means of a spring 42 which is compressed by a sprocket member 43 fixed on the end of the power shaft. Rotation of the cam disc 38 is normally prevented by a latch 44 (FIGURES 4 and 6) engaging in a notch 45 in the periphery of said cam.

The latch 44 is arranged to be withdrawn to permit the cam disc to rotate with the power shaft, by means of a solenoid 46 mounted on the housing 47 of the power gearing and connected to be energized from a suitable power source when either of the micro-switches 35 is closed. Such rotation of the cam disc causes it to engage the actuating lever 48 of a rejection control device in the form of a second micro-switch 49 also mounted on said gear housing, and close said switch. Closure of this switch causes energization of an ejecting mechanism 51 (FIGURE 2) which is fixedly mounted at one side of the conveyor 10. This ejector mechanism comprises a solenoid 52 which actuates a plunger having a flat pad 53 on its end in position to engage and eject laterally the defective article when it comes opposite the ejector device.

Means are provided for exactly spacing the articles to be gauged and to synchronize their travel with the forward lateral movement of the carriage 16 caused by the rotation of the cam 24. For this purpose, a screw conveyor 54 (FIGURES 1 and 2) is rotatably mounted at one side of the line of bottles, having convolutions so spaced and with such a pitch as to maintain uniform spacing and travel of the bottles into and out of the gauging position. A spring loaded guide rail device 55 maintains the bottles in proper bearing engagement with the screw conveyor.

Means for rotating the screw conveyor in proper synchronism with the rotation of the cam 24 is provided comprising a cross shaft 56 having a sprocket 57 fixed thereon which is rotated from the sprocket 43 on the power shaft 29, by means of a chain 58. Shaft 56 is connected to the screw conveyor by miter gearing 59. The power shaft 29 thus becomes a common operating means for traversing the gauge and the articles to be gauged.

As best shown in FIGURE 3, the timing of the screw conveyor 54 with respect to the cam 24 is obtained by means of an idler sprocket 61 mounted on a swinging arm 62, the position of which is adjustable by means of a manually rotatable telescopic link device 63. In order to maintain the tension of the chain throughout the range of adjustment of the idler 61, the chain, after passing over a fixed idler sprocket 64, is caused to pass over a sprocket 65 mounted on a swinging arm 66 which is urged in a position to tighten the chain by means of a tension spring 67.

In operation, the articles to be tested are brought by the screw conveyor 54 into position where the necks of the bottles are directly below the gauge 13 at the time that the cam 24 has positioned the carriage 16 at the limit of its retrograde movement, and the gauge 13 is in its midstroke position poised above the neck of the bottle as shown in FIGURE 1. As the cam 24 and screw conveyor 54 are rotated in timed relation from the power shaft 29, the carriage 16 and the bottle in the gauging position travel in synchronism, and the gauge 13 is thrust into the neck of the bottle and then withdrawn during this lateral movement in unison, this operation taking place during one-half revolution of the cam 24. The second half revolution of the cam brings the carriage back to the starting position and returns the gauge 13 to its median position, ready for gauging the next article. During this backward movement of the carriage the gauge assembly is raised by the roller 23 to its uppermost position as shown in FIGURE 4, where the key 37 is so high it passes over the switch bar 36 without closing either of the switches 35.

If an article has a neck which is constricted beyond the allowable tolerance, the gauge 13 is unable to enter, whereby the key 37 on the stem of the gauge is caused to engage the bar 36 and close either or both of the micro-switches 35. The solenoid 46 is thus energized to withdraw the latch 44 and permit the cam disc 38 to rotate with the power shaft 29. This rotation of the cam disc causes closure of the micro switch 49 after a predetermined rotation of the power shaft. The consequent energization of the ejector solenoid 52 is thus caused to occur at the time that the defective article has reached the position opposite to the ejector. Actuation of the plunger of solenoid 52 thus causes the pad 53 to engage and eject the defective article laterally.

Although certain structure has been shown and described in detail, it will be understood that changes may be made in the design and arrangement of parts without departing from the spirit of the invention as defined in the appended claims.

I claim:

1. A gauging device for articles in transit comprising means for positively separating and conveying the articles past the gauging area at a constant linear speed and in uniformly spaced relation, a reciprocable carriage member, a go-no go gauge mounted on said carriage for testing the critical dimension of the articles to be gauged, means on said carriage for projecting the gauge into operative position during the forward stroke of the carriage and for retracting it to idle position during the return stroke of the carriage, means for positively traversing said gauge at the same linear speed and in vertical alignment with the article to be gauged during the movement of the gauge into and out of operative relation to said article, common actuating means for said conveying means for the articles to be gauged and said traversing means for the gauge, and said traversing means for the gauge including means for securing and maintaining the vertical alignment of the gauge with the article to be gauged, and means responsive to the arrest of the projecting movement of the gauge by an article being gauged, for ejecting the defective article.

2. A gauging device as set forth in claim 1 in which the means for separating and traversing said articles includes a screw conveyor the convolutions of which receive and embrace said articles individually in sequence throughout their passage through the gauging area, and means for rotating said screw conveyor at constant speed from said common actuating means.

3. A gauging device for articles in transit comprising means for conveying the articles past the gauging area, a go-no go gauge for testing the critical dimension of the articles to be gauged, means for projecting the gauge into operative position and retracting it to idle position, means for traversing said gauge in synchronism with the travel of the article to be gauged during the movement of the gauge into and out of operative relation with said article, and means responsive to arrest of the projecting movement of the gauge by an article being gauged, for ejecting the defective article, the means for conveying the articles to be gauged including means for maintaining said articles separated a uniform distance and traversing them at a uniform linear speed as they pass through the gauging area, a common source of power and operating means for the means for traversing said gauge and the means for conveying the articles to be gauged past the gauging area including a rotary power shaft, the means for traversing the gauge including a reciprocating carriage for the gauge, a cam fixed on the power shaft, and a cam follower fixed on the carriage; the means for conveying the articles to be gauged through the gauging area including a rotary screw conveyor, and means operated by the power shaft for rotating said screw conveyor.

4. A gauging device as set forth in claim 3 in which said cam is formed with a contour such that equal angular movements of the cam cause equal linear traversing movements of the cam follower.

5. A gauging device as set forth in claim 3 in which the means operated by the power shaft for rotating the screw conveyor includes means for adjusting and maintaining the timed relation between the power shaft and the screw conveyor during the operation of the gauge.

6. A gauging device for articles in transit comprising means for conveying the articles past the gauging area, a go-no go gauge for testing the critical dimension of the articles to be gauged, means for projecting the gauge into operative position and retracting it to idle position, means including a power shaft for traversing said gauge in synchronism with the travel of the article to be gauged during the movement of the gauge into and out of operative relation with said article, and means responsive to arrest of the projecting movement of the gauge by an article being gauged for ejecting the defective article, including an ejector, means for energizing the ejector, and a sensing device movable with the gauge for engaging and activating an element of the energizing means during the traversal of the gauge when the projecting movement of the gauge has been arrested by a defective article, said means for energizing the ejector including a time delay device causing the ejection to take place when the defective article has traveled a predetermined distance beyond the gauging area, said time delay device including a control device for the ejector, a trip member mounted on the power shaft and means responsive to the engagement of said sensing device with said element of the energizing means for causing the trip member to rotate with the power shaft and engage and actuate the control device for the ejector after a predetermined rotation of the power shaft.

References Cited

UNITED STATES PATENTS 2,596,342   5/1952   McNutt et al. _____ 209—82
3,100,570   8/1963   White _____ 209—82

ALLEN N. KNOWLES, *Primary Examiner.*